P. WERTZ.
EMERGENCY AND EQUALIZING VALVE FOR AIR BRAKE SYSTEMS.
APPLICATION FILED FEB. 18, 1914.

1,160,801. Patented Nov. 16, 1915.

WITNESSES INVENTOR

UNITED STATES PATENT OFFICE.

PETER WERTZ, OF PITTSBURGH, PENNSYLVANIA, ASSIGNOR TO SIMPLEX AIR-BRAKE COMPANY, OF PITTSBURGH, PENNSYLVANIA, A CORPORATION OF DELAWARE.

EMERGENCY AND EQUALIZING VALVE FOR AIR-BRAKE SYSTEMS.

1,160,801.  Specification of Letters Patent.  Patented Nov. 16, 1915.

Application filed February 18, 1914. Serial No. 819,530.

*To all whom it may concern:*

Be it known that I, PETER WERTZ, a resident of Pittsburgh, in the county of Allegheny and State of Pennsylvania, have invented a new and useful Improvement in Emergency and Equalizing Valves for Air-Brake Systems, of which the following is a specification.

This invention relates to an emergency and accelerator or equalizing valve for use in air brake systems.

The object of the invention is to provide a valve of this kind which serves to exhaust the train pipe to different degrees after service and emergency applications, which will prevent the brakes from kicking off upon a forward surge of train pipe air, and which will permit an emergency application of the brakes when the engine is running second or subsequent in a multiple header.

The invention comprises the construction and arrangement of parts hereinafter described and claimed.

Figure 1:
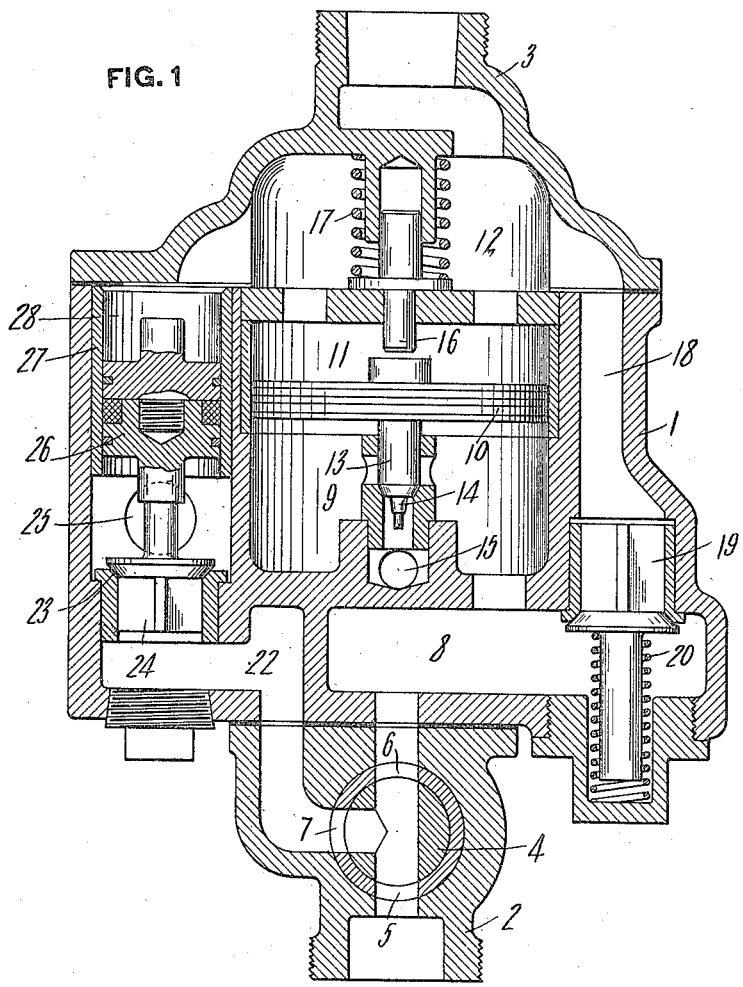
Figure 2:
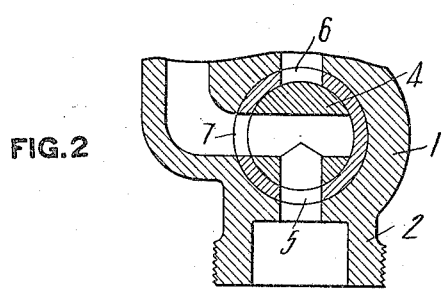

In the accompanying drawing Figure 1 shows a vertical section through a valve embodying the invention; and Fig. 2 shows a similar detail section of a three-way cock in another position.

The valve comprises a suitable casing 1 having a threaded portion 2 for connection to the train pipe and a threaded portion 3 for connection to the engineer's brake valve. This valve might, if desired, be made a portion of the engineer's brake valve, but preferably is a separate casing directly connected to the engineer's brake valve. At the train pipe connection is a three-way cock 4 controlling three ports, to-wit, a train pipe port 5, a service exhaust port 6 and an emergency exhaust port 7. When the engine is a single header, or first in a multiple header, the cock 4 is set to the position shown in Fig. 1, to connect ports 5, 6 and 7, but when the engine is second or subsequent in a multiple header it is turned to the position shown in Fig. 2, to connect ports 5 and 7 and to close port 6.

Port 6 communicates with a chamber 8 which has communication with chamber 9 below the accelerator piston 10, while the chamber 11 above said piston is in communication with the chamber 12 which communicates directly with the engineer's valve. The stem of piston 10 is provided with a differential valve comprising the large portion 13 and the small portion 14 and which valve coöperates with a seat controlling the exhaust port 15. Above the piston 10 is a graduating stem 16 normally held projected downwardly by means of compression spring 17. The valve is provided with a by-pass 18 leading around the piston 10 and in which by-pass is a check valve 19 seated toward the engineer's brake valve by spring 20.

Emergency exhaust port 7 communicates through passage 22 with the seat 23 with which coöperates exhaust valve 24 which controls the emergency exhaust port 25. Valve 24 is carried by a piston 26 working in a suitable cylinder 27 and having its lower face constantly open to the atmosphere through exhaust port 25 and its upper face subject to pressure in chamber 28 which is in constant communication with chamber 12.

The shape and details of the parts described may vary considerably and further detailed description is not necessary.

The operation of this valve is as follows: When the cock 4 is set, as shown in Fig. 1 of the drawings, the pressure coming from the main reservoir by way of the engineer's valve flows through chamber 12 and passage 18, unseating check valve 19, and thence flows through chamber 8, port 6, cock 4 and passage 5 to the train pipe, charging the train pipe in the usual manner to the desired pressure, whereupon check valve 19 will seat. In applying the brakes for service application the engineer at his brake valve vents a small portion of air from chamber 12, unbalancing the pressures on the two faces of piston 10, due to the fact that the check valve 19 is either already closed, or closes as soon as the pressure in chamber 12 is slightly reduced. This causes the piston 10 to move upwardly and raise the exhaust valve from its seat, thereby permitting chamber 9 and the train pipe to exhaust to the atmosphere through port 15. Normally the piston 10 is checked in its upward movement when it encounters graduating stem 16, in which position the larger portion 13 of the exhaust valve restricts the discharge orifice. Upon larger reductions of train pipe pressure, however, the piston 10 moves upwardly and compresses spring 17 until the smaller portion 14 of the exhaust valve only controls the exhaust port, thereby giving a more rapid exhaust from the train pipe. After normal application of the brakes, should there be a surge of air forwardly in the train pipe it would become effective on the lower face of the piston 10, thereby lifting said piston still farther and providing a larger vent from the train pipe, which would prevent the surge from kicking off the brakes on the forward end of the train.

In emergency applications a sudden reduction of air in chamber 12 is effected, which not only causes piston 10 to lift fully, but also causes piston 26 to lift, due to the fact that the train pipe pressure acting upon the lower face of valve 24 overcomes the reduced pressure on the upper surface of piston 26, which is larger than the lower face of valve 24, thereby opening the emergency exhaust 25 and resulting in a quick depletion of train pipe air. In all service applications the reduction of pressure above the piston 26 is not sufficient to overcome the differential due to the larger area of the upper surface of piston 26 as compared with the lower surface of valve 24, but in emergency applications the reduction of pressure above piston 26 is sufficient to overcome this differential.

When the engine is second or subsequent in a double header the cock 4 is turned to the position shown in Fig. 2, so as to close port 6 and connect ports 5 and 7, so that the exhaust valve 13, 14, becomes inoperative. Generally, the engineer on the second engine is not supposed to take any part in the braking of the train, but in the event that he should see a danger first, by throwing his engineer's brake valve to emergency position and quickly exhausting pressure from above the piston 26, the emergency vent valve 25 will be opened, as hereinbefore described, thereby applying the brakes throughout the train. As a consequence the engineer on the second engine has control of the brakes of the train for emergency application, but not for service application, thus giving an element of safety in the event that the engineer on the leading engine is suddenly incapacitated or fails to see the danger.

What I claim is:—

1. In an air brake system an exhaust valve comprising a casing having connections to the train pipe and to the engineer's valve, and valve mechanism in said casing arranged to control a vent to the atmosphere and to automatically enlarge said vent on the surge of air toward the front end of the train, a by-pass around said valve mechanism, and a check valve in said by-pass seating toward the engineer's valve connection.

2. In an air brake system an exhaust valve casing having connections to the engineer's brake valve and to the train pipe, and a valve in said casing controlling a vent from the train pipe to the atmosphere, a piston connected to said valve and subjected on both faces to train pipe pressure and arranged to open the vent when the pressure on the engineer's valve side is reduced, a graduating spring in the path of movement of said piston in its opening movement, a by-pass around said valve and piston, and a check valve in said by-pass seating toward the engineer's valve connection.

3. In an automatic air brake system an exhaust valve casing having connections to the train pipe and to the engineer's valve, a valve in said casing controlling a vent to the atmosphere and arranged to open said vent upon reduction of pressure on the engineer's brake valve side thereof, and an emergency vent valve controlling a larger exhaust from the train pipe and arranged to open said exhaust upon a large reduction of pressure on the engineer's brake valve side thereof.

4. In an automatic air brake system, an exhaust valve casing having connections to the engineer's brake valve and to the train pipe, a vent valve in said casing controlling a vent to the atmosphere and arranged to open said vent upon reduction of pressure on the engineer's brake valve side thereof, an emergency vent valve also controlling a vent from the train pipe, and differential piston mechanism actuating said emergency vent valve and arranged to open the vent upon a large reduction of pressure upon the engineer's brake valve side thereof.

5. In an automatic air brake system an exhaust valve casing having connections to the train pipe and to the engineer's valve, a valve in said casing controlling a vent to the atmosphere and arranged to open said vent upon reduction of pressure on the engineer's brake valve side thereof, an emergency vent valve controlling a larger exhaust from the train pipe, differential piston mechanism actuating said emergency vent valve and arranged to open said exhaust upon a large reduction of pressure on the train pipe side thereof, a by-pass around said valves, and a check valve in said by-pass seating toward the engineer's valve.

6. In an automatic air brake system, an exhaust valve casing having connections to the engineer's brake valve and to the train pipe, a vent valve in said casing controlling a vent to the atmosphere and arranged to open said vent upon reduction of pressure on the engineer's brake valve side thereof, an emergency vent valve also controlling a vent from the train pipe, differential piston mechanism actuating said emergency vent valve and arranged to open the vent upon a large reduction of pressure upon the engineer's brake valve side thereof, a by-pass around said valves, and a check valve in said by-pass seating toward the engineer's valve.

In testimony whereof, I have hereunto set my hand.

PETER WERTZ.

Witnesses:
 ELBERT L. HYDE,
 WILLIAM B. WHARTON.

Copies of this patent may be obtained for five cents each, by addressing the "Commissioner of Patents, Washington, D. C."